United States Patent
Davidsson et al.

(10) Patent No.: US 7,395,736 B2
(45) Date of Patent: Jul. 8, 2008

(54) ALL-WHEEL DRIVE TORQUE VECTORING SYSTEM

(75) Inventors: Per-Olof Davidsson, Limhamn (SE); Bo Lundström, Glumslov (SE); Lars Severinsson, Hishult (SE)

(73) Assignee: Haldex Traction AB (SE)

( * ) Notice: Subject to any disclaimer, the term of this patent is extended or adjusted under 35 U.S.C. 154(b) by 0 days.

(21) Appl. No.: 11/766,520

(22) Filed: Jun. 21, 2007

(65) Prior Publication Data
US 2008/0004150 A1 Jan. 3, 2008

Related U.S. Application Data

(63) Continuation of application No. PCT/SE2005/001990, filed on Dec. 21, 2005.

(30) Foreign Application Priority Data
Dec. 22, 2004 (SE) .................................. 0403113

(51) Int. Cl.
*F16H 48/30* (2006.01)
(52) U.S. Cl. ................... 74/665 F; 475/88; 475/116; 475/140; 74/650; 74/665 A; 192/87.15
(58) Field of Classification Search .............. 192/87.14, 192/87.16
See application file for complete search history.

(56) References Cited

U.S. PATENT DOCUMENTS 3,595,353 A * 7/1971 Beneke ..................... 192/18 A 3,805,632 A * 4/1974 Prokop et al. ................. 74/364
4,528,872 A * 7/1985 Umemoto et al. ............ 475/142
4,827,784 A * 5/1989 Muller et al. ................. 74/330
5,358,084 A 10/1994 Schramm .................... 192/21.5
6,581,744 B2 * 6/2003 Matsufuji ................ 192/87.15
6,786,317 B2 * 9/2004 Matsufuji et al. ........ 192/87.15

FOREIGN PATENT DOCUMENTS

EP 0 352 994 1/1990

OTHER PUBLICATIONS

Written Opinion of the International Searching Authority, Mar. 15, 2006, 4 pages.
International Search Report, Mar. 14, 2006, 3 pages.

* cited by examiner

*Primary Examiner*—David D. Le
(74) *Attorney, Agent, or Firm*—St. Onge Steward Johnston & Reens LLC

(57) ABSTRACT

An all-wheel drive system for a vehicle having an engine and a drive shaft is arranged between the drive shaft and front and rear propellable shafts. These shafts are interconnected by first and second clutches respectively, and the propellable shafts are coupled to front and rear wheels, for transferring torque from the drive shaft to the front and/or rear wheels. The all-wheel drive system further includes at least first and second actuators that are coupled to at least first and second clutches, where at least the first clutch is engaged by a spring and at least the first actuator is coupled for disengaging the first clutch when the first actuator is operated. The second actuator is coupled for engaging the second clutch when the second actuator is operated.

6 Claims, 5 Drawing Sheets

ALL-WHEEL DRIVE TORQUE VECTORING SYSTEM

CROSS-REFERENCE TO RELATED APPLICATIONS

The present application is a continuation of pending International patent application PCT/SE2005/001990 filed on Dec. 21, 2005 which designates the United States and claims priority from Swedish patent application 0403113-4 filed on Dec. 22, 2004, the content of which is incorporated herein by reference.

FIELD OF THE INVENTION

The present invention relates to an all-wheel drive system for vectoring the motive torque between a front and rear axle.

BACKGROUND OF THE INVENTION

The patent publications EP-A-O.352.994 and U.S. Pat. No. 5,358,084 disclose a distributing system which comprises two separate output axles with active couplings/clutches that independently will distribute torque to the front and rear axles. The two couplings of the described system are active, which means that no transfer or distribution of torque is possible if there is loss of electrical power to the couplings. This will make it impossible to drive the vehicle. Moreover, two separate couplings lead to a higher cost compared to a more common system with one coupling parallel to a center differential.

SUMMARY OF THE INVENTION

It is an object of the present invention to provide an all-wheel drive system with vectoring of the motive torque that overcomes the drawbacks of the prior art.

BRIEF DESCRIPTION OF THE DRAWINGS

The present invention will be described with references to the attached drawings, wherein.

DETAILED DESCRIPTION OF THE INVENTION

An all-wheel drive system with torque vectoring will be described in more detail below with references to the attached drawings.

The all-wheel drive system with torque vectoring can distribute a motive torque between a front axle and a rear axle, depending on the current situation and conditions. The system comprises two parallel disc clutches DC1, DC2 mounted in a housing H, as can be seen in FIGS. 1-4. The torque from a gearbox (not shown) enters the system through the housing H via an input axle IA. The distributed torque leaves the system through the housing H via a front OAF and a rear output axle OAR. One of the clutches DC1 is activated by a spring S1, preferably a disc spring, and is deactivated by an actuator A1. The second clutch DC2 is activated by an actuator A2. The spring-activated clutch DC1 can be coupled either to the front OAF or rear output axle OAR. The actuators A1, A2 may be electromechanical or hydraulic.

Figure 1:
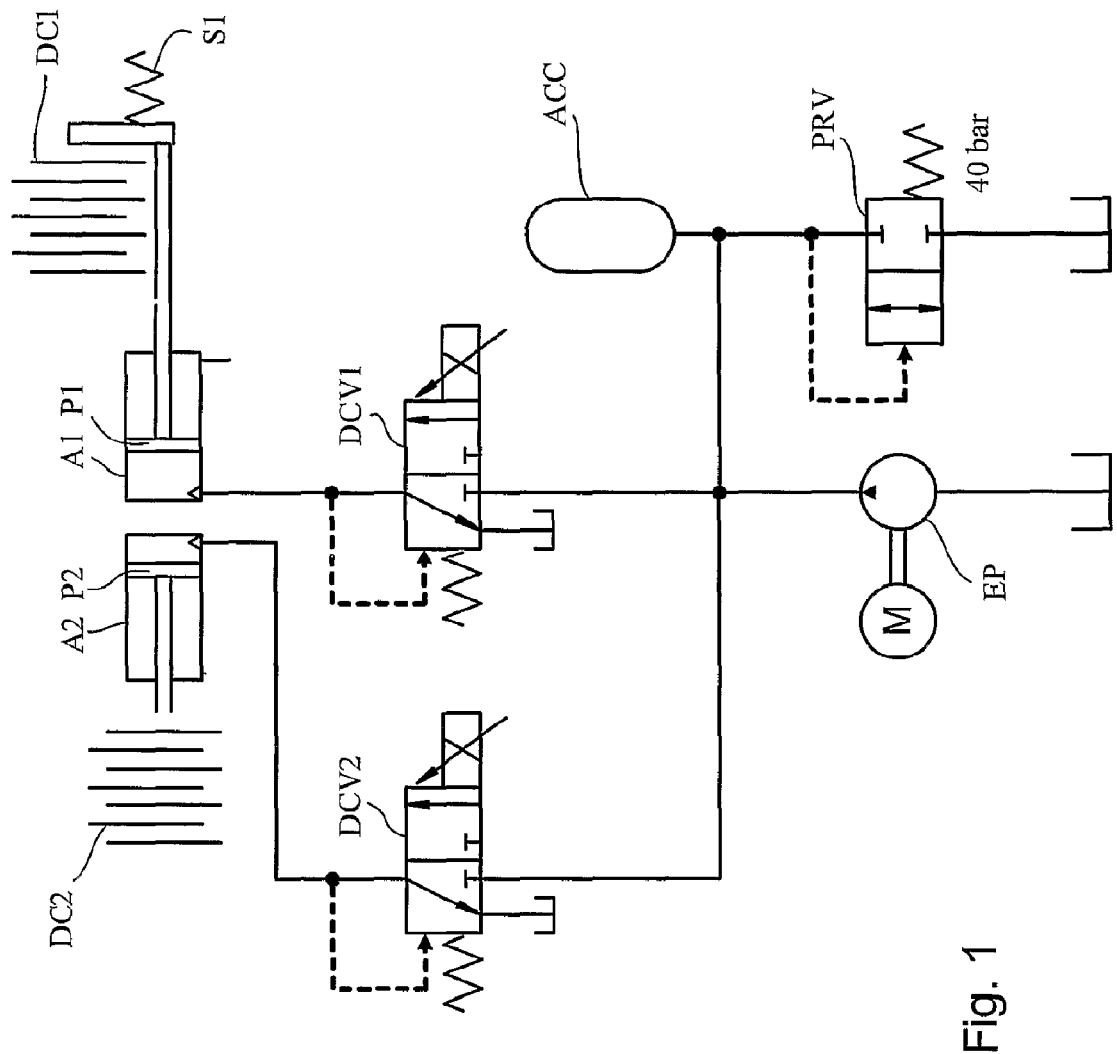
FIG. 1 is a schematical view of a hydraulic circuit according to a first embodiment of the invention.
Figure 2:
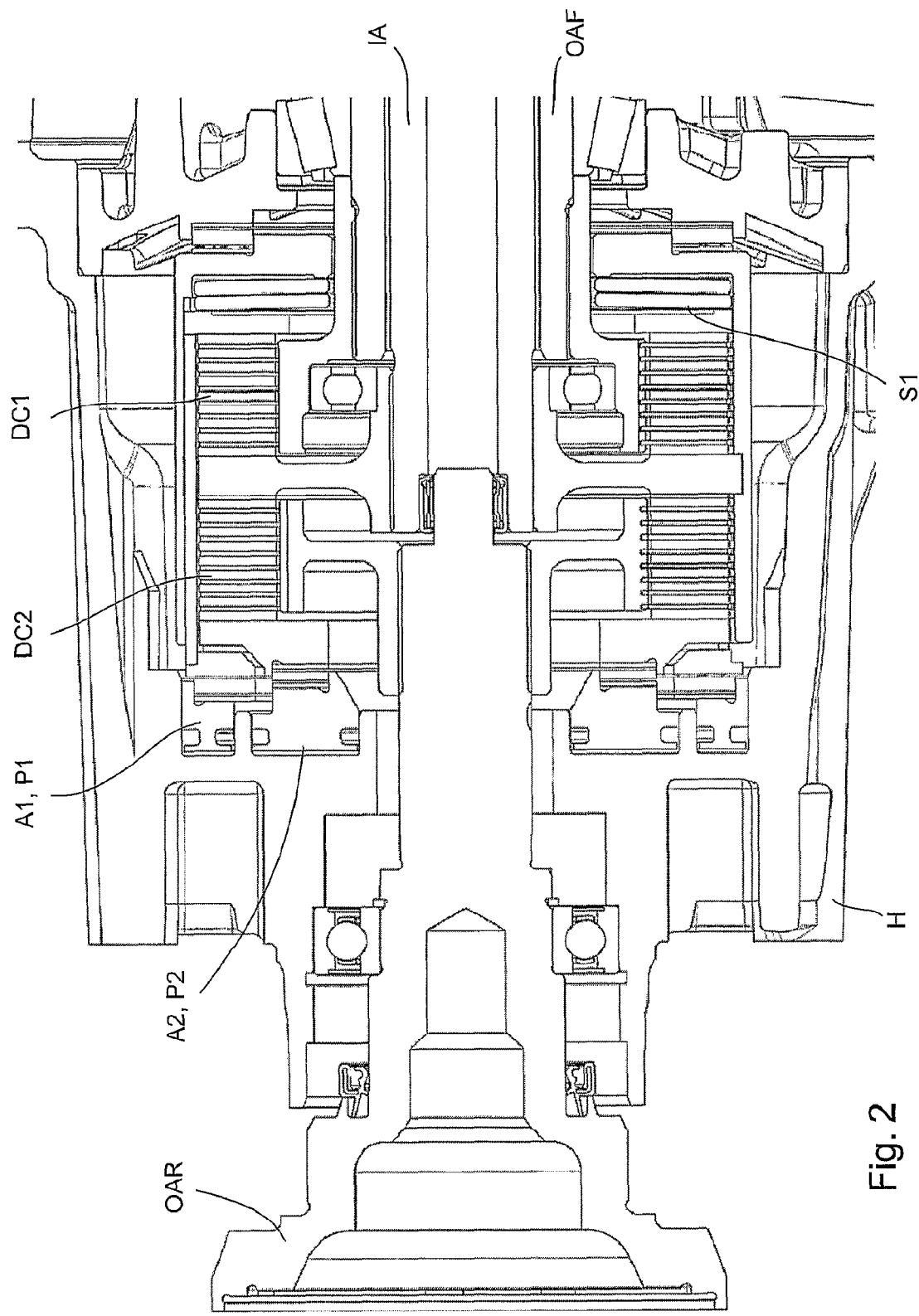
FIG. 2 is a cross-sectional view of the embodiment shown in FIG. 1.

In a first embodiment, as can be seen in FIGS. 1 and 2, the clutches DC1, DC2 are each coupled to an actuator A1, A2. One of the actuators A2 is arranged to activate the clutch DC2 and one of the actuators A1 is arranged to deactivate the clutch DC1 against the spring action of the spring S1. The actuators are powered by hydraulic fluid supplied from an electric pump EP via the directional control valves DCV1 and DCV2. The system may further comprise an accumulator ACC and a pressure relief valve PRV, set to open at a predetermined maximum pressure, e.g. 40 bar.

Figure 3:
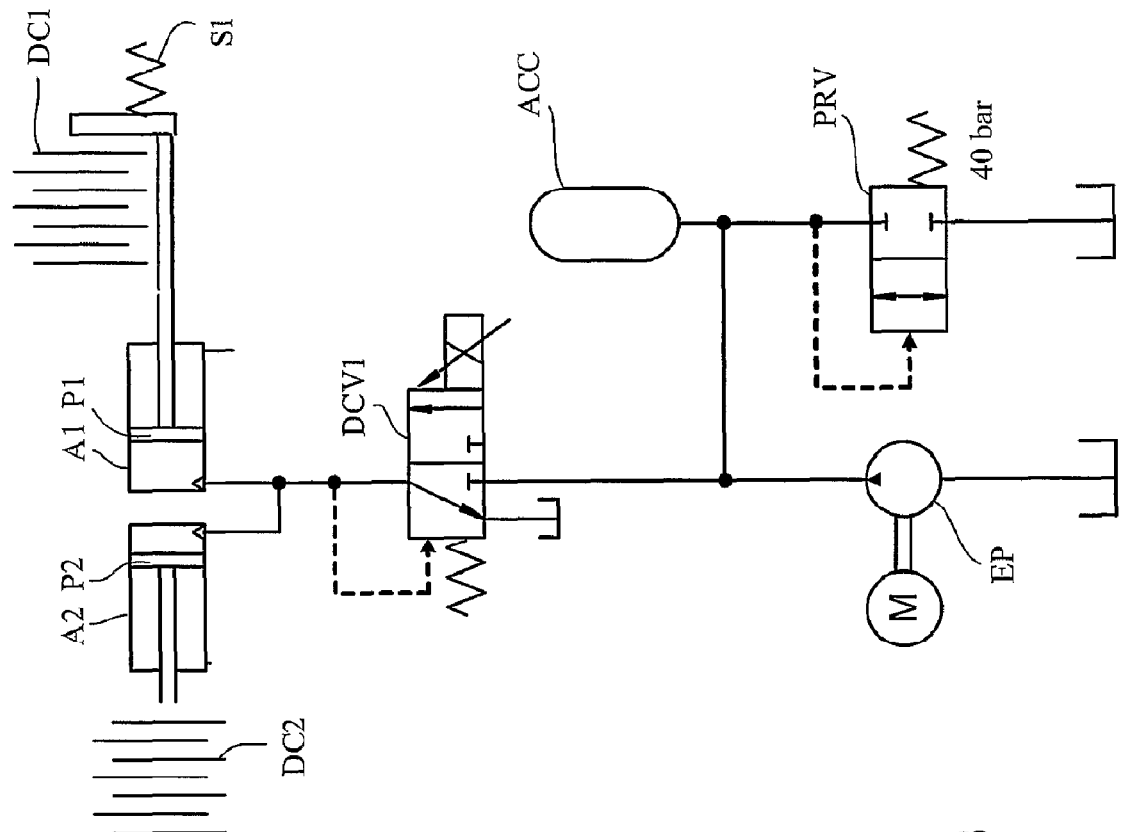
FIG. 3 is a schematical view of a hydraulic circuit according to a second embodiment of the invention.
Figure 4:
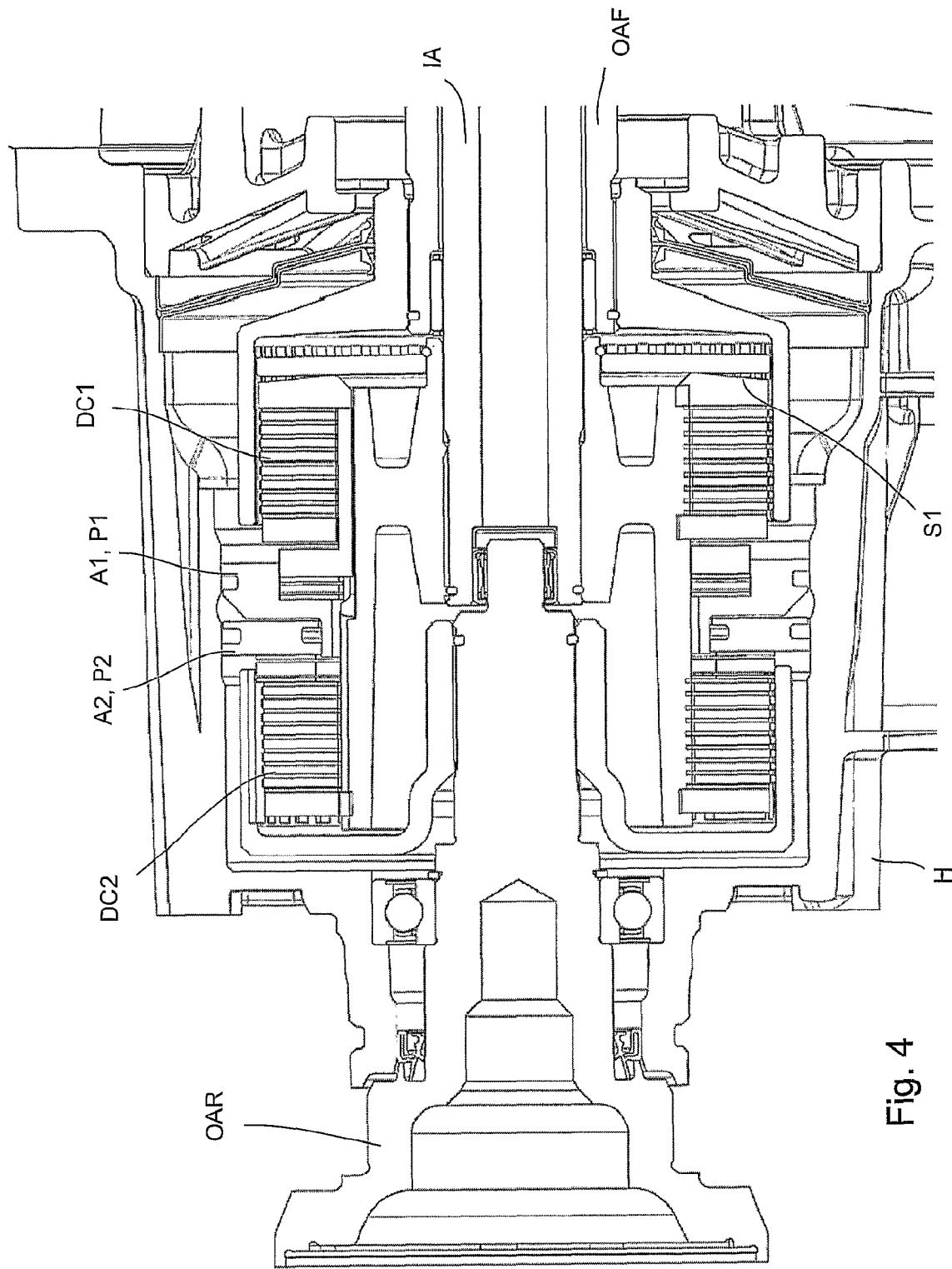
FIG. 4 is a cross-sectional view of the embodiment shown in FIG. 3.

Another embodiment can be seen in FIGS. 3 and 4, where only one hydraulic source is provided, between the two pistons P1, P2 of the actuators A1, A2. The hydraulic fluid forces the pistons in opposite directions with the same force, and an almost zero axial reaction force will result within the transmission housing. Hydraulic power is still supplied by the electric pump EP, which may be coupled to an accumulator ACC and a pressure relief valve PRV in the same way as for the first embodiment. An electromechanical solution could also be introduced in this embodiment, with one or two ball ramps (not shown) activating the clutches DC1, DC2.

The above-mentioned systems have an advantage over prior-art systems, in that they comprise a spring-activated clutch that will ensure that traction is always transferred to an output axle, even when an actuator (or all of them) is out of order. The double-clutch arrangement is further more compact and may utilise the same power source. If only one hydraulic source (one valve) is used, or if an electromechanical actuator is used, the design will be simple and robust, and the mechanism for distributing the torque between the front and rear axles will be more secure. When the clutches are powered by the same hydraulic source, their operation will be simultaneous and the clutches will never be open in parallel with consequent loss of power transfer.

Figure 6:
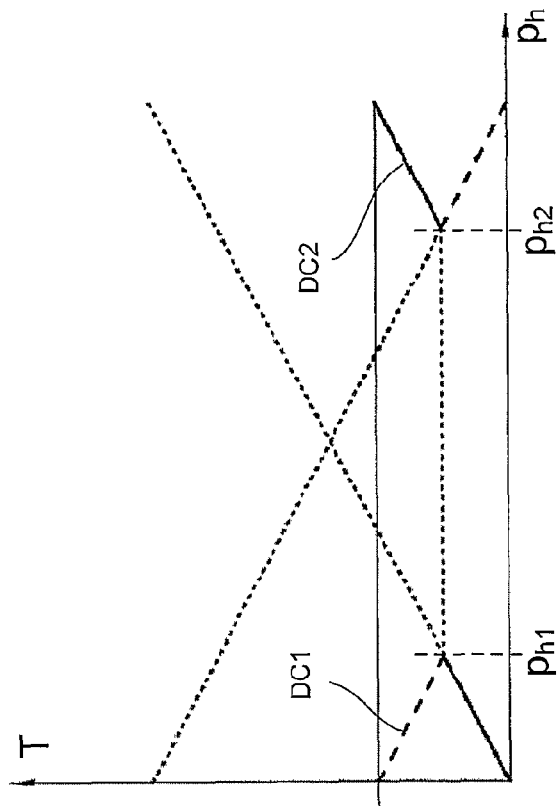
FIG. 6 is a diagram showing the amount of torque that is transferred by each clutch at a part load condition for the second embodiment.
Figure 5:
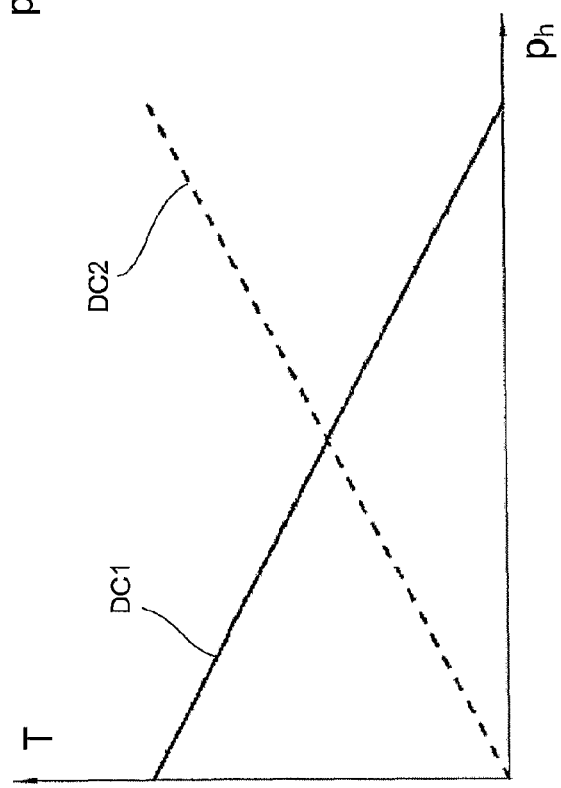
FIG. 5 is a diagram showing the amount of torque that each clutch can deliver, depending on the applied pressure, for the second embodiment.

The function of the two clutches can be seen in FIGS. 5 and 6, where the maximum transferable torque for each clutch is plotted against the hydraulic pressure in the corresponding actuator. When the hydraulic pressure increases, see e.g. FIG. 5, one of the clutches is being partially engaged, indicated by the dashed line, and the other clutch is being disengaged partially, indicated by the solid line. At full hydraulic pressure, the initially unengaged clutch is fully engaged and the initially engaged clutch is fully disengaged.

When the input axle IA provides a lower torque, the behaviour is slightly different, see FIG. 6. At zero hydraulic pressure, only one DC1 of the two clutches DC1, DC2 is engaged and locked and the other clutch DC2 becomes engaged gradually as the hydraulic pressure increases, but is subjected to slip. As the transferred torques from the two clutches are equal, at $p_h i$, both clutches become locked. As the hydraulic pressure increases above a certain value $p_{h2}$, the initially locked clutch DC1 starts to lose its engagement and is subjected to slip. The torque is instead transferred by the other clutch DC2 which is still locked.

The diagrams shown in FIGS. 5 and 6 are normalized, and the transferable torques actually depend on the size of each clutch as well as other parameters, such as road conditions.

The forces on the clutches, in the diagrams, are given from the hydraulic pressure, but can just as well be supplied by a strictly mechanical actuator.

What is claimed is:

1. An all-wheel drive system for a vehicle having an engine and a drive shaft, the all-wheel drive system being arranged between the drive shaft and front and rear propellable shafts, wherein the drive shaft is interconnected to one of said front and rear propellable shafts by a first clutch and the drive shaft is interconnected to another of said front and rear propellable shafts by a second clutch, and the front propellable shaft being coupled to front wheels of the vehicle and the rear propellable shaft being coupled to rear wheels of the vehicle, for selectively transferring torque from the drive shaft to at least one of the front wheels and the rear wheels depending upon whether either or both of said first and second clutches is engaged, characterized in that the all-wheel drive system comprises at least first and second actuators being coupled to said first and second clutches, where at least said first clutch is engaged by a spring and at least said first actuator is coupled for disengaging said first clutch when the first actuator is operated, and where at least said second actuator is coupled for engaging said second clutch when the second actuator is operated.

2. An all-wheel drive system according to claim 1, wherein the actuators are operated synchronously.

3. An all-wheel drive system according to claim 2, wherein the actuators are arranged so that they operate in opposite directions and are substantially coaxial so that a substantially zero net axial reaction force is transferred to an accommodating structure.

4. An all-wheel drive system according to claim 2, wherein the actuators are driven by a common source of pressurized hydraulic fluid.

5. An all-wheel drive system according to claim 1, wherein the actuators are hydraulically driven.

6. An all-wheel drive system according to claim 5, wherein the actuators are driven by a common source of pressurized hydraulic fluid.

* * * * *